T. J. WHALEN.
TIRE.
APPLICATION FILED JULY 15, 1919.

1,321,688.

Patented Nov. 11, 1919.
3 SHEETS—SHEET 1.

WITNESSES
J.H.Crawford

INVENTOR.
T.J.Whalen,
BY
Victor J. Evans
ATTORNEY.

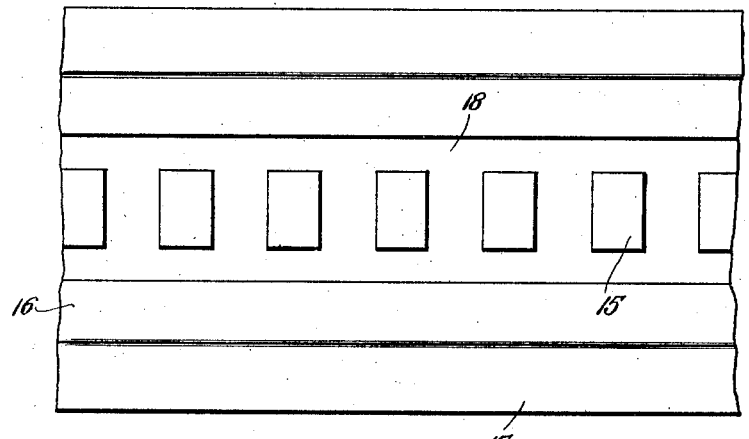
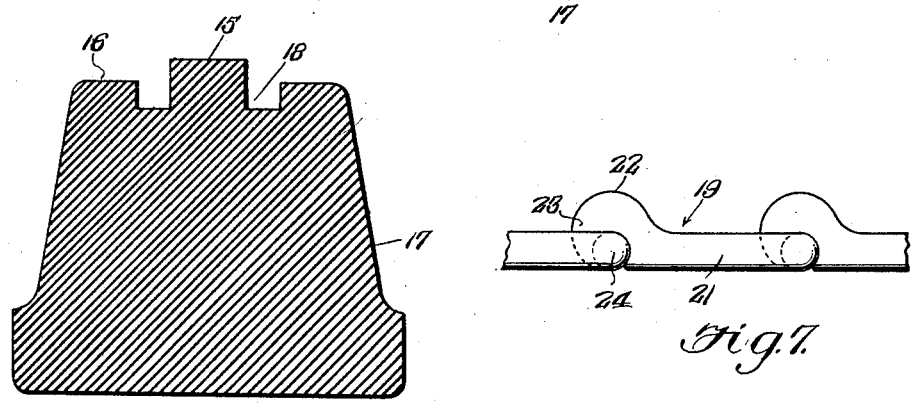
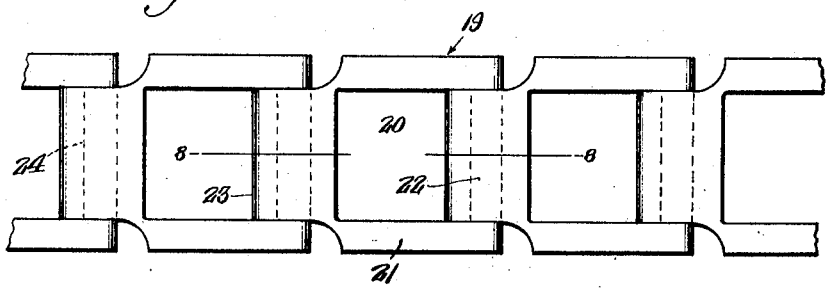

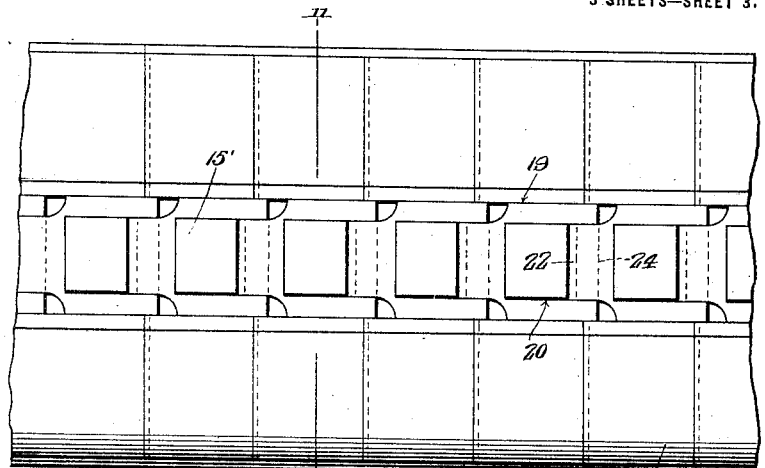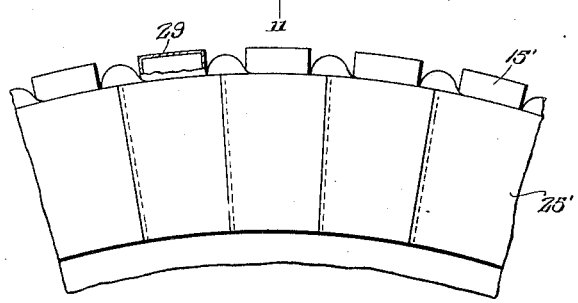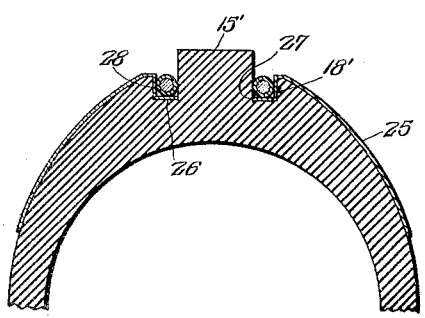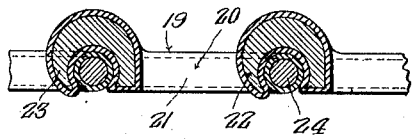

UNITED STATES PATENT OFFICE.

THOMAS J. WHALEN, OF KITTANNING, PENNSYLVANIA.

TIRE.

1,321,688.　　　　Specification of Letters Patent.　　Patented Nov. 11, 1919.

Application filed July 15, 1919. Serial No. 310,881.

*To all whom it may concern:*

Be it known that I, THOMAS J. WHALEN, a citizen of the United States, residing at Kittanning, in the county of Armstrong and State of Pennsylvania, have invented new and useful Improvements in Tires, of which the following is a specification.

This invention relates to improvements in tire constructions.

The object of the invention is to produce a tire having a tread surface of such a construction as to positively prevent the skidding of the wheel, and also in which the tread surface is materially reinforced by the anti-skidding means so that the life of the tire is thus materially increased.

A further object of the invention is to provide a tread surface which may be applied to any ordinary construction of tires to insure the anti-skidding of a wheel.

A further object of the invention is to produce a tire having a tread surface on which are formed spaced projections and channels surrounding the projections whereby a metallic link belt may be arranged in the depressions, the links of the belt being detachably connected so that the same may be attached to the tire when deflated and effectively sustained thereon when inflated.

Other objects and advantages will present themselves as the nature of the invention is better understood, reference being had to the accompanying drawings, in which:

Fig. 4 is a plan view of a solid tire constructed in accordance with this invention.

Fig. 5 is a transverse sectional view therethrough.

Fig. 6 is a plan view of a portion of the chain belt.

Fig. 7 is a side elevation thereof.

Fig. 8 is a sectional view approximately on the line 8—8 of Fig. 6.

Fig. 9 is a plan view illustrating a modification.

Fig. 10 is a side elevation thereof.

Fig. 11 is a sectional view approximately on the line 11—11 of Fig. 9.

Figure 1:
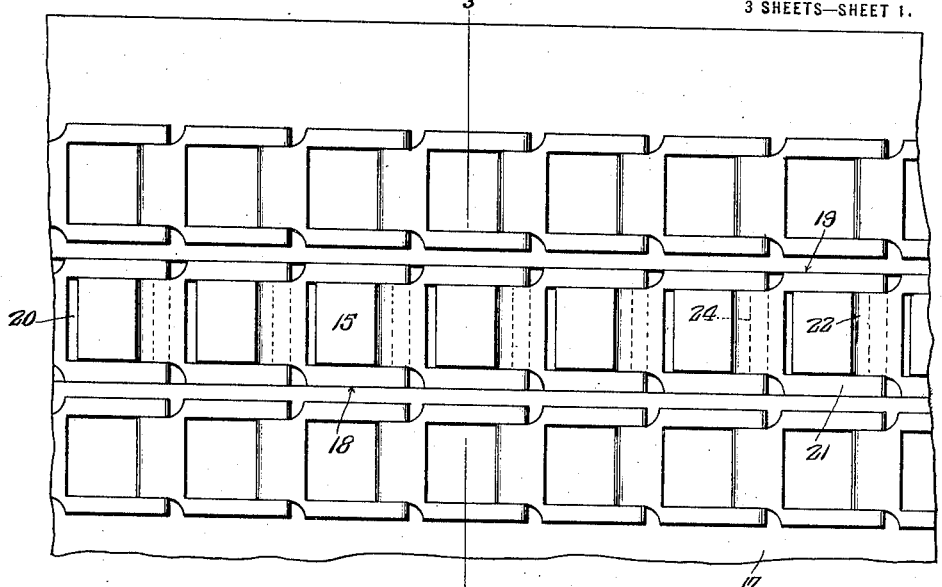
Figure 1 is a plan view of a portion of a tire constructed in accordance with this invention.
Figure 2:
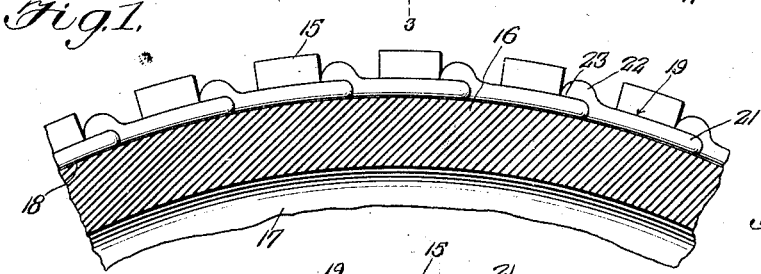
Fig. 2 is a side elevation thereof.
Figure 3:
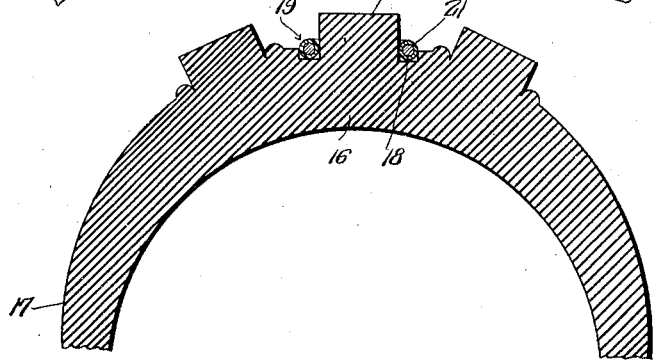
Fig. 3 is a sectional view approximately on the line 3—3 of Fig. 1.

In carrying out my invention it is my purpose to construct a tire or a tread for a tire provided with spaced block-like projections and depressions surrounding the projections, the said projections and depressions, of course, being formed in the manufacture of the device. The projections are in the nature of substantially rectangular blocks 15 arranged at the center of the tread portion 16 of the tire 17. The depressions 18 which surround the blocks 15 are of a form or shape to receive therein links 19. The blocks project a considerable distance outward of the tread surface of the tire so that they, in themselves, provide calks which contacting with the road surface prevent the skidding of the tire. The links 19 may be fully received in the depressions, the openings 20 in the said links receiving the blocks 15 so that the sides 21 of the said links as well as one of the ends 22 thereof will contact with the blocks. The end 22 is in the nature of a hook, being rounded upon itself and having its outer portion downturned as at 23, while the opposite end of the said links is in the nature of a round bar 24 that is engaged by the hook of the co-acting link. By this construction the links are detachable from each other and may be separately applied to the tread. If desired, and as illustrated in Figs. 1, 2 and 3 of the drawings the tread surface, at the sides of the central series of blocks and links may have arranged thereon additional reinforcing anti-skidding chain belts, the links of the said belts being constructed as previously described. The links of the chain belt may be incased in a rubber body, as illustrated in Figs. 6 to 8 of the drawings. When the improvement is applied to a solid tire, such as is commonly employed on trucks only the central chain belt need be employed.

In lieu of the side chain belts I may provide the tread at the opposite sides of the central chain belt with metallic reinforcements in the nature of lapping plates 25, as illustrated in Figs. 9 to 11. Each of these plates 25 may be constructed of a continuous element, that is, the central portion thereof may be depressed as at 26 to be received in the depression 18' of the tread, and the said portions 26 are also provided with openings 27 through which the blocks 15' pass. The plates, at their said central portions 26 are flanged upwardly as at 28 to engage with the side walls of the depression 18', and from thence are continued over the tread surface of the tire, terminating approximately at points opposite each other so that the plates are of sufficient length to protect the sides of the tire from punctures.

If desired plates 25′, similar to those just described may be employed, the only difference between the last and first mentioned plates being that the latter have their central portions 26, instead of being provided with the openings 27 for the blocks 15′, are formed with box-like housings 29 within which the blocks 15 are received, so that the tread surface of the tire will be entirely metallic.

It is believed, from the foregoing description, when taken in connection with the drawings, the simplicity of the construction and the advantages thereof will be readily apparent without further detailed description.

Having thus described the invention what is claimed as new, is:—

A tire having a chain belt partly embedded in the tread surface thereof and metallic reinforcements at the sides of the said chain belt.

In testimony whereof I affix my signature this May 16, 1919.

THOMAS J. WHALEN.